UNITED STATES PATENT OFFICE.

GRIFFITH W. JONES, OF NASHVILLE, TENNESSEE.

IMPROVEMENT IN HOLLOW-GRATE FEED-WATER HEATERS.

Specification forming part of Letters Patent No. 117,176, dated July 18, 1871.

*To all whom it may concern:*

Be it known that I, GRIFFITH W. JONES, of Nashville, in the county of Davidson and State of Tennessee, have invented a new and Improved Feed-Water Heater for Boilers; and I do hereby declare that the following is a full, clear, and exact description thereof, which will enable others skilled in the art to make and use the same, reference being had to the accompanying drawing forming part of this specification.

Figure 1:
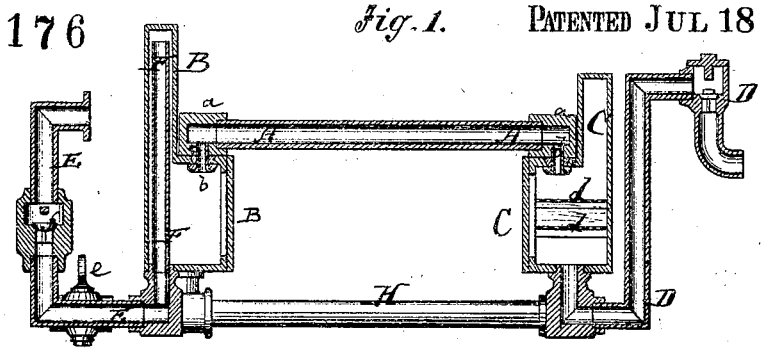
Figure 2:
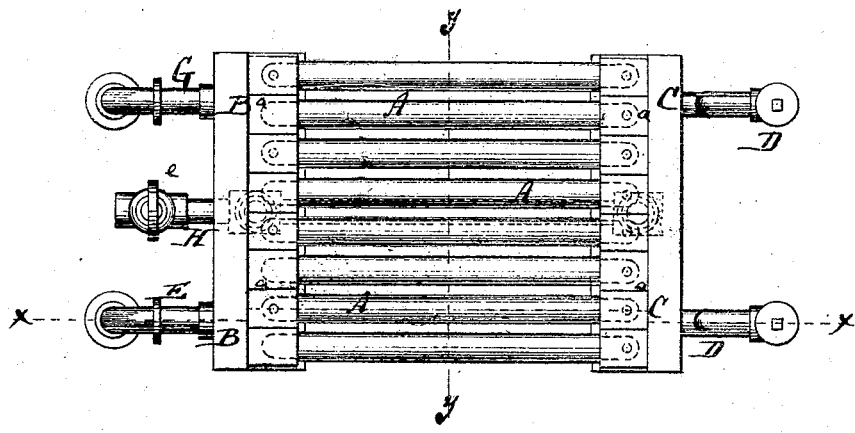
Figure 3:
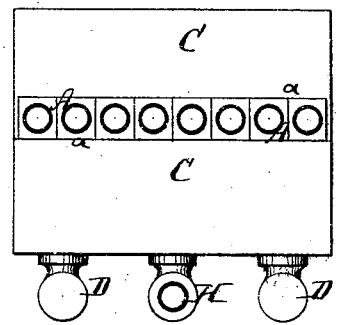

Figure 1 represents a longitudinal section of my improved feed-water heater, $x\,x$, Fig. 2, being the section line. Fig. 2 is a plan or top view of the same. Fig. 3 is a transverse section of the same, $y\,y$, Fig. 2, being the section line.

Similar letters of reference indicate corresponding parts.

This invention relates to a novel arrangement of hollow grate-bars, and to a new connection of the same with the feed-pump and steam-generator, with the object of utilizing all heat that would otherwise be wasted, and economizing the generating of steam in the boiler. The invention consists in the use of tapped bolts, by which the tubular grate-bars are secured to the chambers that form their supports; also, in the construction and arrangement of certain parts, as hereinafter described.

A A in the drawing are the tubular grate-bars, secured with their end into heads $a\,a$, which rest on shoulders of transverse vessels or reservoirs B and C. These vessels are secured within the fire-place of a boiler in suitable manner, (B being next to the fire-door,) and constitute chambers for supplying the grate-bars with water and receiving it therefrom. Each tube is screwed into the head $a$, and the latter is, by a bolt, $b$, secured to the reservoir, the bolt screwing through a conical plug, $c$, which will close a corresponding aperture in the vessel, all as indicated in Fig. 1. The bolt $b$ is perforated or made tubular to constitute a water-connection between grate and chamber. The bolts $b$ on the vessel B are not all perforated, but some are left solid, so that the water may be somewhat blocked and detained in the grate-bars. The same result may be obtained by making the bores in the bolts on B smaller than in those on the vessel C. The vessel C is, by pipes D D that enter its lower end, connected with the feed-pump, which forces water into the same. This water arises in C, enters the grate-bars, and passes through the same into the chamber B. A pipe, E, enters the vessel B and connects it with the boiler, but has its inner end F extend to the uppermost part of B to receive only the hottest water. The vessel B is, moreover, higher than C, to retard circulation and provide for a thorough absorption of heat by the water. The pipe E contains a check-valve, $f$, which closes downward, opening only under pressure from the pump. G is another pipe connecting the vessel B with the boiler, and containing a check-valve (not shown) which opens downward, but is closed when the pump is in action. The pipe G serves to supply the grate-bars and vessels B C with water from the boiler whenever the pump is not in operation, and prevents the burning of the bars. Within the vessel C are arranged two perforated plates, $d\,d$, supported on suitable brackets and serving to retain between them charcoal or other filtering matter, by which the water is purified before it is admitted to the grate-bars and boiler. H is a blow-off pipe connected with the lower parts of both vessels B C, and kept closed, unless when it is desired to remove sediments and impurities from said vessels. In such case its valve $e$ is opened.

Having thus described my invention, I claim as new and desire to secure by Letters Patent—

1. The perforated bolts applied to the hollow grate-bars for the purpose of securing the same to their supporting-vessels B C, and continuing the supply and discharge-channels for the same, substantially as herein shown and described.

2. The conical perforated plugs $c$ arranged on the vessels B C, in connection with the tubular bolts $b$ and heads $a$, substantially as herein shown and described.

3. The discharge-chamber B made higher than the supply-chamber C of the hollow grate-bars, and provided with the discharge-pipe F at its upper end, substantially as herein shown and described.

GRIFFITH W. JONES.

Witnesses:
B. W. RANDALL,
H. N. PRINGLE.